(12) United States Patent
Bregman et al.

(10) Patent No.: US 12,554,625 B2
(45) Date of Patent: *Feb. 17, 2026

(54) TESTING CONTINUOUS INTEGRATION AND CONTINUOUS DEPLOYMENT (CI/CD) PIPELINE

(71) Applicant: RED HAT, INC., Raleigh, NC (US)

(72) Inventors: Arie Bregman, Gan Yavne (IL); Ilan Gersht, Bat Yam (IL)

(73) Assignee: Red Hat, LLC, Raleigh, NC (US)

( * ) Notice: Subject to any disclaimer, the term of this patent is extended or adjusted under 35 U.S.C. 154(b) by 856 days.

This patent is subject to a terminal disclaimer.

(21) Appl. No.: 17/538,543

(22) Filed: Nov. 30, 2021

(65) Prior Publication Data
US 2023/0168996 A1 Jun. 1, 2023

(51) Int. Cl.
*G06F 11/3668* (2025.01)

(52) U.S. Cl.
CPC ...... *G06F 11/3688* (2013.01); *G06F 11/3684* (2013.01); *G06F 11/3692* (2013.01); *G06F 11/3696* (2013.01)

(58) Field of Classification Search
CPC .... G06F 8/65; G06F 11/3688; G06F 11/3696; G06F 11/3684; G06F 11/3692
See application file for complete search history.

(56) References Cited

U.S. PATENT DOCUMENTS

| | | | |
|---|---|---|---|
| 10,025,692 B2 | 7/2018 | Wood et al. | |
| 10,216,509 B2 | 2/2019 | Martin Vicente et al. | |
| 10,474,559 B2 | 11/2019 | Moorthi et al. | |
| 10,515,005 B1 | 12/2019 | Burrell et al. | |
| 10,664,388 B2* | 5/2020 | Mitchell | G06F 11/3698 |
| 10,691,514 B2 | 6/2020 | Mcclory et al. | |
| 11,042,473 B2* | 6/2021 | Joyce | G06F 11/3692 |
| 11,288,061 B1* | 3/2022 | Johnson | G06F 8/51 |
| 2015/0026121 A1* | 1/2015 | Shani | G06F 11/3688 |
| | | | 707/748 |
| 2017/0228312 A1 | 8/2017 | Shani et al. | |
| 2019/0294528 A1* | 9/2019 | Avisror | G06F 11/3688 |
| 2019/0384694 A1* | 12/2019 | Ramraz | G06F 11/3692 |
| 2021/0240604 A1 | 8/2021 | Pande et al. | |
| 2021/0248058 A1* | 8/2021 | Hattingh | G06F 11/3688 |
| 2021/0303296 A1* | 9/2021 | Ahuja | G06F 11/3698 |
| 2022/0171699 A1* | 6/2022 | Velammal | G06F 11/3692 |
| 2023/0065447 A1* | 3/2023 | Yao | G06F 11/3698 |
| 2023/0065530 A1* | 3/2023 | Mohanty | G06F 8/20 |
| 2023/0096376 A1* | 3/2023 | Spertus | G06F 9/4881 |
| | | | 712/23 |
| 2025/0138989 A1* | 5/2025 | Benjamin | G06F 11/3688 |

OTHER PUBLICATIONS

Behm, Dennis et al., "Packaging and Deployment Strategies in an Open and Modern CI/CD Pipeline Focusing on Mainframe Software Development", IBM Whitepaper Z DevOps Acceleration Program, Release 1.0, Jan. 2020, 36 pages.

* cited by examiner

*Primary Examiner* — Wei Y Mui
*Assistant Examiner* — Brahim Bourzik
(74) *Attorney, Agent, or Firm* — Dority & Manning, P.A.

(57) ABSTRACT

A method includes identifying a pipeline of a plurality of pipelines of a continuous integration and continuous delivery/deployment (CI/CD) system, selecting a repository of a plurality of repositories utilized by the identified pipeline, modifying the repository, determining whether to test the modified repository and responsive to determining to test the modified repository, executing the identified pipeline with the modified repository.

9 Claims, 5 Drawing Sheets

TESTING CONTINUOUS INTEGRATION AND CONTINUOUS DEPLOYMENT (CI/CD) PIPELINE

TECHNICAL FIELD

The present disclosure is generally related to computer systems, and more particularly, to testing continuous integration and continuous deployment (CI/CD) pipeline.

BACKGROUND

In computer program development, continuous integration is the practice of merging developer working copies of computer program code for an application into a shared mainline code base, generally several times a day. Typically, each programmer of a computer development team submits source code for the application being developed daily (or more frequently). With continuous integration, a set of operations referred to herein as a build process ("build") is performed to produce executable code from the source code. The executable code may be for an application, for example. The set of operations for providing a build may include compiling source code files to produce the executable code for an application, performing tests on the executable code, and instating or deploying the executable code. The build process may be performed at periodic times or with each significant source code change.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
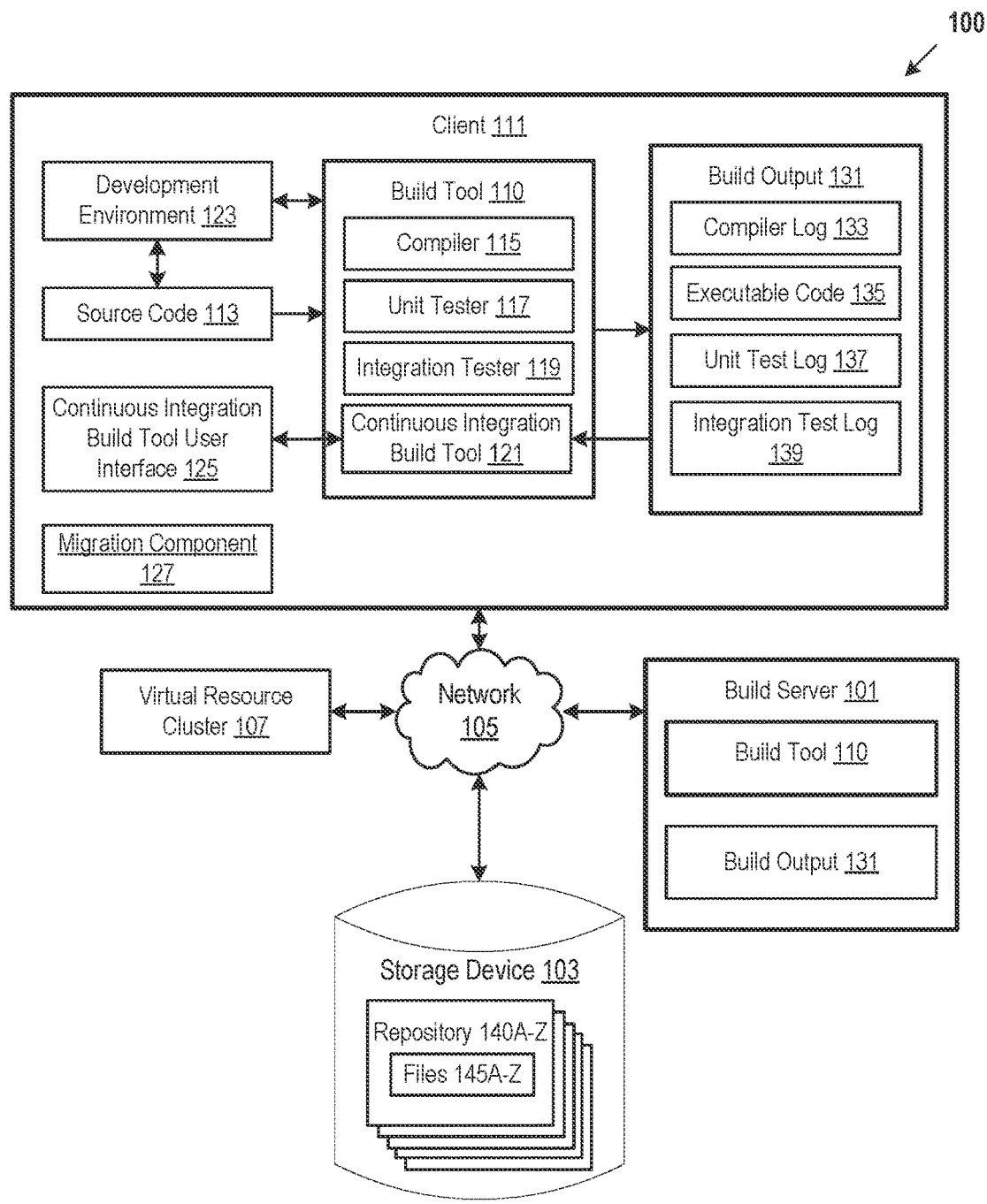
FIG. 1 depicts a high-level component diagram of an example computer system architecture, in accordance with one or more aspects of the present disclosure.

Described herein are methods and systems for testing continuous integration and continuous deployment (CI/CD) pipeline using a modified repository. Continuous software integration tools referred to herein as "build tools" may perform build processes to generate software images from source code and other data. Software images may be, for example, executable code of software application programs. Source code may include instructions in a programming language that may be translated to executable code. Compiler programs may perform the translation from source code to executable code. Other data may also be processed, e.g., transformed to suitable formats and included in software images. A build process may cause the appropriate source code to be translated to executable code and included in the resulting software images. Instructions specifying how to perform the build process may be provided to the build tools in the form of build files, such as build scripts or declarative descriptions of the files to be built in terms of files from which they are built (e.g., files of a source code repository). A particular set of instructions specifying how to perform a specific build process are referred to herein as a software build "job." A job may be executed, e.g., by a build tool running on a computing node, and the executing job is referred to herein as an "active build." A computing node may be a virtualized or bare metal computer system (e.g., a server) that provides computing resources to execute jobs. A job may include a set of stages, which may be executed sequentially in an active build. A job may thus be referred to as a "pipeline" of one or more stages. The stages may include, for example, compile, test, and deploy stages. The compile stage may translate source code to executable code. The test stage may perform tests to verify that the executable code operates correctly. The deploy stage may install the executable code on host machines, for example. A build may execute for a substantial period of time (e.g., several minutes to several hours or days).

In addition to following a particular set of instructions to perform the build process, the job may utilize various repositories to perform the build process. In some instances, changes may occur to repositories used by the job, thereby requiring testing of the job containing changes to the repository. Typically, a pull request containing the changes made to the repository is submitted. The pull request refers to a request to notify that changes will be made to a repository. Upon approval of the pull request, the changes made to the repository are merged.

In some instances, after merging the changes to the repository, the repository may be selectively identified (e.g., cherry-picked) for use by the job (e.g., execution of the job to test the changes to the repository). However, the ability to selectively identify repositories based on the changes introduced by the pull request is not inherently supported in build tools. Selectively identifying repositories based on the changes introduced by the pull request requires modifying the build tools to include a build parameter.

Alternatively, in other instances, the changes made to the repository may be cloned. Cloning refers to creating a repository containing the changes introduced by the pull request to the repository. However, the ability to clone the changes to the repository is not supported in build tools. In particular, the job is unable to use the clone(s) associated with the changes to the repository. Accordingly, the process of testing the job with the changes to the repository may be time-consuming and inefficient.

Aspects of the present disclosure address the above and other deficiencies by providing technology that improves modification of repositories used by a pipeline (e.g., job) and testing the pipeline using the modified repositories. In particular, by providing the ability to select a repository from various repositories used by the pipeline. The repository is modified and saved in a specified storage location. In an illustrative example, the modified repository is saved in a workspace (e.g., a storage location where the pipeline clones the project and/or repositories used by the pipeline). Accordingly, during testing, the pipeline, the various repositories excluding a repository corresponding to the modified repository are cloned to the workspace before testing. In yet another illustrative example, the modified repository is saved in a separate storage location. Accordingly, while testing the pipeline, the modified repository may be copied to the workspace (e.g., a storage location in which the pipeline clones the project and/or repositories used by the pipeline), or the pipeline may directly use the modified repository from the separate storage location.

Advantages of the present disclosure include, but are not limited to, improving efficiency and speed of testing a pipeline with changes to a project and/or repository.

Various aspects of the above-referenced methods and systems are described in detail below by way of examples rather than by way of limitation. The examples provided below discuss the modification of repositories used by pipelines and testing pipelines with modified repositories. In other examples, any suitable component that interacts with the pipelines and the repositories can perform the methods and systems described herein.

FIG. 1 depicts a high-level block diagram of an example computing environment 100 that includes a continuous integration build tool user interface 125, in accordance with one or more aspects of the present disclosure. The computing environment 100 may provide build management services that include executing build operations to perform builds of source code 113 to produce build output 131. The builds may be performed in accordance with instructions provided by the continuous integration build tool user interface 125. In some embodiments, the computing environment 100 may include one or more build servers 101 for running the sets of operations for providing builds in a continuous integration environment. The builds may be for source code 113, e.g., of an application that is being developed. An application may be, for example, a web application, a desktop application, a browser application, etc. An application may be a messaging application, a video application, a social networking application, a video sharing application, a photo-sharing application, a chat application, a mobile application of a content provider, or any combination of such applications. An application may be a computationally large or data-intensive application, such as a forecasting application, a modeling application, a data analysis application, etc. The build server(s) 101 may be hosted on any type of computing node. The computing node may include a virtualized or bare metal computing device such as a server computer, a desktop computer, a portable computing device (e.g., netbooks, laptop computers, and the like).

Build tool 110 may be located on client 111, on build server 101, or both. Build tool 110 may execute a set of operations to provide the build of the mainline code. The mainline code may be the base of a project on which development progresses. The set of operations may include compiling the code, testing the code when the code is compiled, testing remote code when the code is added to the larger mainline code base, and performing continuous build operations, e.g., performing a build at periodic intervals or in response to user requests, and presenting information about the status of executing builds and the results of completed builds. A software build job (e.g., a pipeline of one or more stages) can be executed by a build tool 110.

Users, such as programmer or developers, may use a development environment 123 to submit source code 113 to build tool 110 on client 111 and/or build tool 110 on build server 101. Users may submit source code to build tool 110 located on the build server 101 from client 111 via network 105. Build tool 110 or other tools (e.g., a version control tool) may merge the submitted source code 113 with a shared mainline code base stored and maintained by build server 101. Users may submit source code 113 to any of the build tools 110 daily (or more frequently) and request execution of a build process for the submission.

A client machine 111 may be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. Network 105 may be a private network (e.g., a local area network (LAN), a wide area network (WAN), intranet, or other similar private networks), or a public network (e.g., the Internet).

Storage device 103 may be physical memory and may include volatile memory devices (e.g., random access memory (RAM)), non-volatile memory devices (e.g., flash memory, NVRAM), and/or other types of memory devices. In another example, storage device 103 may include one or more mass storage devices, such as hard drives, solid-state drives (SSD)), other data storage devices, or a combination thereof. In yet another example, storage device 103 may be any virtual memory, logical memory, other portion of memory, or a combination thereof for storing, organizing, or accessing data. In a further example, storage device 103 may include a combination of one or more memory devices, one or more mass storage devices, virtual memory, other data storage devices, or a combination thereof, which may or may not be arranged in a cache hierarchy with multiple levels.

Build tool 110 may include a compiler 115 to compile computer source code 113 into executable code 135 and generate other build output 131, such as a compiler log 133 containing output describing progress and results of the compilation process. Build tool 110 may include a unit tester 117 and an integration tester 119 for running automated tests on artifacts (e.g., tangible by-products produced during software development). Unit tester 117 may test that the individual functions in the source code 113 or executable code 135 work properly and generate unit test log 137 that contains output(s) describing progress and results of the unit tester 117. Integration tester 119 may test the executable code 135 in an environment where the executable code 135 can be executed by users. Build tool 110 may include continuous integration build tool 121 for performing continuous build operations (e.g., performing a build at periodic intervals or in response to user requests) and presenting information about the status of executing builds and the results of completed builds. Continuous integration build tool 121 may start builds, e.g., by executing compiler 115, unit tester 117, and integration tester 119 in accordance with a build configuration script that contains instructions for compiling the source code and testing the resulting executable code 135. Continuous integration build tool 121 may monitor build output 131. The continuous integration build tool 121 may display progress information, such as the stage of the build (e.g., compiling, unit testing, or integration testing), the status of an executing build (e.g., how many files have been compiled, how many tests have passed, and how many tests have failed). Continuous integration build tool 121 may detect the completion of a build by receiving a result value from compiler 115, unit tester 117, and integration tester 119, or by detecting particular text in the build output logs, for example. Continuous integration build tool 121 may generate an integration test log 139 containing information describing the progress of the operations performed by the continuous integration build tool 121.

Integration tester 119 may create virtual resource cluster 107 for the integration testing of the artifacts. The virtual resources in cluster 107 may be containers, virtual machines, container(s) within a virtual machine, and/or virtual machine(s) running within a container. A container may refer to an isolated set of resources allocated to executing an application and/or process independent from other applications and/or processes. A virtual machine may be an emulated computer system created using software that includes its own operating system (referred to as a guest operating system) and executes application programs. A host machine may host one or more virtual resources for virtualizing one or more application servers for executing the artifacts for the application for the integration testing.

In one example, the host machine for virtual resource cluster 107 may be the same computing machine that hosts build server 101 and/or client 111. In another example, virtual resource cluster 107 may include one or more other computing machines not shown by FIG. 1. The computing machines may be server computer systems, desktop computers, or any other computing devices.

A host machine may allocate a certain amount of its computing resources (e.g., processor resources (CPU resources), physical or virtual memory, input/output (I/O) resources, network resources, etc.) to individual virtual resources (e.g., virtual machine, container). The host machine may multiplex the underlying hardware platform (e.g., infrastructure) among the virtual resources on the host machine. For a virtual machine, the layer providing the virtualization is commonly referred to as a hypervisor also known as a virtual machine monitor (VMM), a kernel-based hypervisor, or part of a host operating system. The hypervisor may emulate the underlying hardware (e.g., infrastructure) of the host machine, using the virtual machine. Accordingly, build tool 110 (or build server 101 and/or client 111) may be allotted a different set of computing resources.

An application is deployed in a container may run under the host operating system. The host machine for the container may include a container engine to create and manage the containers. In one implementation, a container may run on a virtual machine to provide an extra layer of separation between applications running on a guest operating system. In one implementation, a virtual machine may run on a container to maintain virtual machines' isolation and security properties while packaging and distributing computer programs as a container.

Integration tester 119 may run the executable code 135 in virtual resource cluster 107 and run integration tests against the distributed system provided by virtual resource cluster 107. After build tool 110 compiles the source code 113 and runs unit tests and integration tests, build tool 110 may report whether the attempt to provide the build was a success or includes a failure. A failure may be caused by the compiling of the source code failing, unit testing failing, and/or integration testing failing.

Continuous integration build tool user interface 125 may enable users to start one or more active build jobs. Continuous integration build tool user interface 125 presents an active build list, a build queue list, and a jobs list. The jobs list includes one or more job representations, which are user-interface representations of jobs that build tool 110 can execute to perform builds. Instructions can be provided to build tools 110 in the form of build files, such as build scripts or declarative descriptions of the files to be built in terms of files from which they are built. A job can be executed by the build tool 110. A job can include a set of stages, which may be executed sequentially. The job (e.g., pipeline) may utilize various repositories (e.g., repository 140A-Z) of files (e.g. Files 145A-Z) to perform the various stages of the job. Each repository (e.g., 140A-Z) contains files 145A-Z. Files 145A-Z may be storage objects that store the source code data, executable code data, settings data, other data, or a combination thereof. In one example, files 145A-Z may be source code files and include the source code data in human-readable form. In the example shown in FIG. 1, files 145A-Z may be stored in storage device 103. In some embodiments, the repository 140A-Z may be stored in client 111 or with the source code 113. The stages can include, for example, compile, test, and deploy stages. The compile stage may translate source code to executable code. The test stage may perform tests to verify that the executable code operates correctly. The deploy stage may install the executable code on host machines or nodes.

Client 111 may include a pipeline testing component 127. The pipeline testing component 127 may render, via the continuous integration build tool user interface 125, the job list including one or more jobs (e.g., pipelines) used to perform the build. The user may select a pipeline from the job list to provide the user a list of repositories from the storage device 103, utilized by the selected pipeline to perform the build. The pipeline testing component 127 may allow the user to select a repository of the repositories containing a file that the user desires to modify. The pipeline testing component 127 may provide a list of files associated with the selected repository to the user to select a file the user desires to modify. The pipeline testing component 127 may further allow the user to modify the file (e.g., delete, add, or modify a line of code within the file) within the continuous integration build tool user interface 125. In some embodiments, the user may traverse the repositories to modify one or more files associated with varying repositories. Once the files are modified, the pipeline testing component 127 may store the modified repositories (e.g., repository with at least one modified file) to a storage location (e.g., storage device 103). In some embodiments, the storage location may be a storage location used by the build tool 110 to perform the build (e.g., a workspace). In some embodiments, the storage location may be the same as the storage location of the original repositories. In some embodiments, the storage location may be different than the storage location of the original repositories. The pipeline testing component 127 may provide and/or prompt the user to test (e.g., execute) the pipeline associated with the modified repositories within the continuous integration build tool user interface 125. Accordingly, to execute the pipeline associated with the modified repositories, the pipeline testing component 127 may copy the modified repositories from their original storage location to the workspace of the build tool (e.g., a storage location the build tool 110 uses to perform the build by executing the pipeline). In some embodiments, the pipeline testing component 127 may access the modified repositories at the storage location containing the modified repositories rather than copying the modified repositories to the workspace. Additionally, to execute the pipeline, the pipeline testing component 127 may further clone the remaining repositories (e.g., repositories unmodified) to the workspace to execute the pipeline. Thus, once all files are located in the workspace, the build tool 110 may execute the pipeline to test the pipeline with the modified repositories. The pipeline testing component 127 will be discussed in further detail in FIG. 2.

Figure 2:
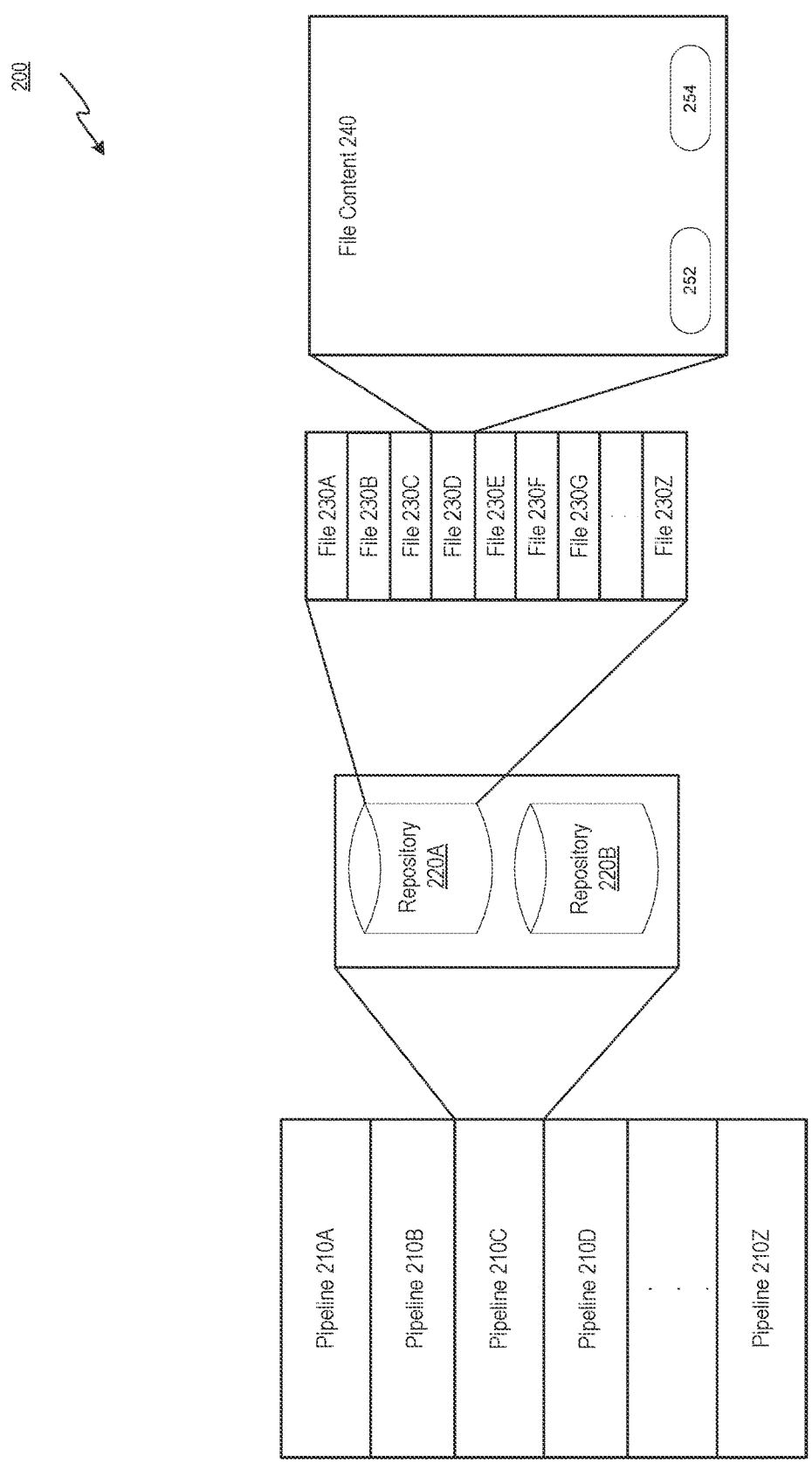
FIG. 2 depicts an example user interface of testing continuous integration and continuous deployment (CI/CD) pipelines using a modified repository, in accordance with one or more aspects of the present disclosure.

FIG. 2 depicts an exemplary graphical user interface for testing continuous integration and continuous deployment (CI/CD) pipelines using a modified repository, in accordance with one or more aspects of the present disclosure. In the example shown, the graphical user interface (GUI) 200 (e.g., the continuous integration build tool user interface 125 of FIG. 1) displays a plurality of available pipelines 210A-Z (e.g., jobs). Each of the plurality of available pipelines 210A-Z includes at least one repository. Each repository includes at least one file.

The pipeline testing component 127 (of FIG. 1) provides GUI 200 a list of the plurality of available pipelines 210A-Z to display to the user. GUI 200 receives a selection of a pipeline (e.g., pipeline 210C), causing the pipeline testing component 127 to provide GUI 200 a list of repositories associated with the pipeline 210C (e.g., repository 220A and repository 220B) to display to the user. GUI 200 receives a selection of a repository (e.g., repository 220A) to be modified by the user. The pipeline testing component 127 provides GUI 200 a list of at least one file (e.g., files 230A-Z) to display to the user. The user selects a file (e.g., file 230D) to be modified. The pipeline testing component 127 provides GUI 200 the file (e.g., file 230D) to display the contents of the file (e.g., file content 240) to the user for modification.

The user may modify the contents of the file (e.g., add and/or delete to the file content 240) within GUI 200. In some embodiments, the GUI 200 prompts the user to select the save the modification button 252 (e.g., the repository associated with the modified file or modified repository). Depending on the embodiment, GUI 200 may display a list of storage locations provided by the pipeline testing component 127 to store the modification. The GUI 200 receives, from the user, a selection of a storage location from the list of storage locations, and the pipeline testing component 127 stores the repository in the storage location. The GUI may further prompt the users to select "use the modified repository" button 254 (e.g., test the pipeline associated with the modified repository).

In one embodiment, to use the modified repository based on the storage location of the modified repository (e.g., the workspace of the pipeline), the pipeline testing component 127 may simply clone the remaining unmodified repositories into the workspace. Once the modified repository and the remaining unmodified repositories are in the workspace of the pipeline, the build tool 110 (of FIG. 1) may execute the pipeline.

In another embodiment, to "use the modified repository" based on the storage location of the modified repository (e.g., a separate storage location from the remaining repositories), the pipeline testing component 127 may copy the modified repository from the storage location to the workspace of the pipeline and clone the remaining repositories unmodified into the workspace. Once the modified repository and the remaining repositories unmodified are in the workspace of the pipeline, the build tool 110 (of FIG. 1) may execute the pipeline.

In yet another embodiment, "use the modified repository" based on the storage location of the modified repository (e.g., a separate storage location from the remaining repositories), the pipeline testing component 127 may clone the remaining repositories unmodified into the workspace. Once the remaining repositories unmodified are in the workspace of the pipeline, the build tool 110 (of FIG. 1) may execute the pipeline and access the modified repository at the storage location during the execution of the pipeline.

Figure 3:
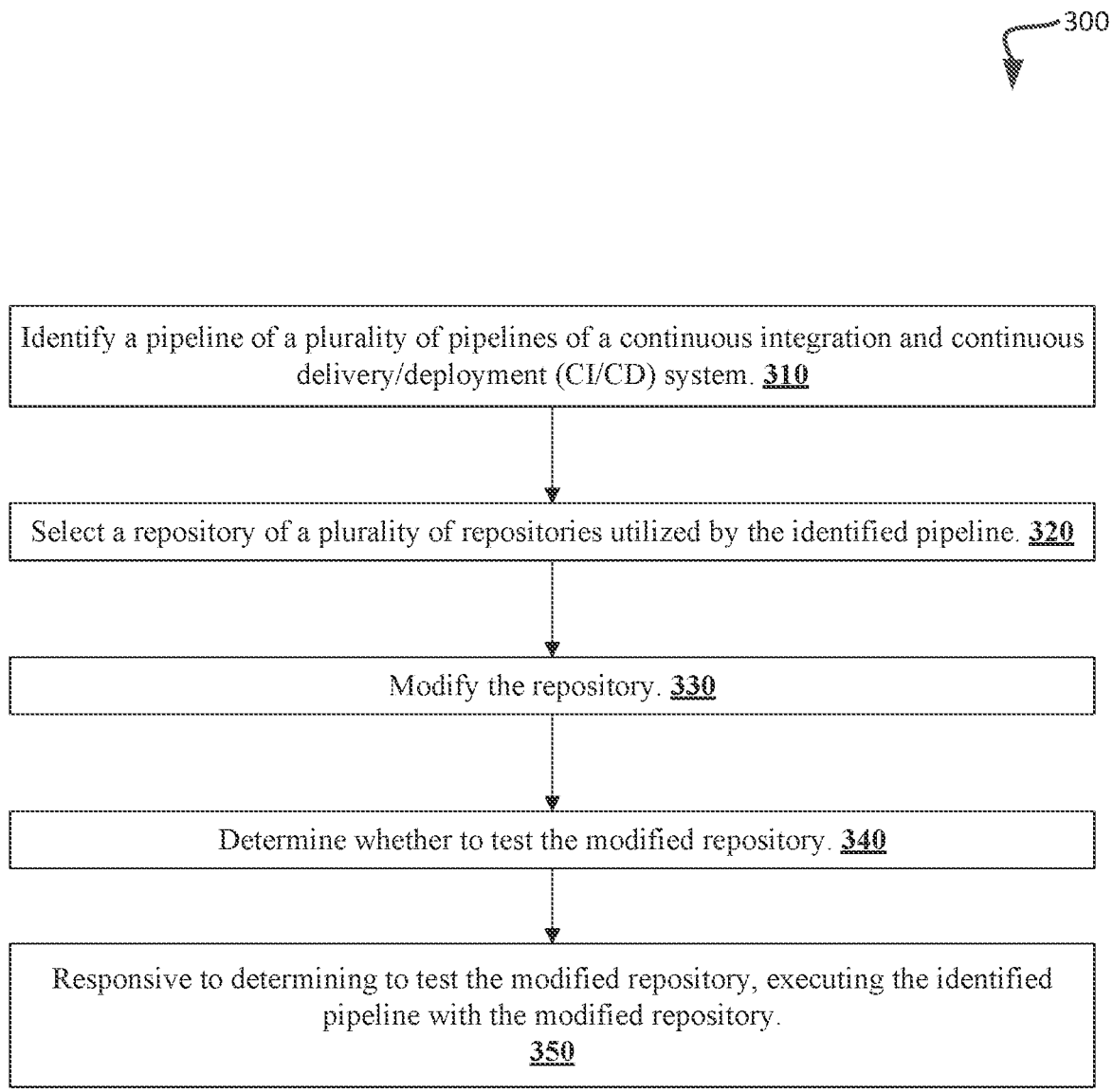
FIG. 3 depicts a flow diagram of a method for testing CI/CD pipelines using a modified repository, in accordance with one or more aspects of the present disclosure.

FIG. 3 depicts a flow diagram of an example method 200 for testing CI/CD pipelines using a modified repository, in accordance with one or more aspects of the present disclosure. The method may be performed by processing logic that may comprise hardware (circuitry, dedicated logic, etc.), computer-readable instructions (run on a general-purpose computer system or a dedicated machine), or a combination of both. In an illustrative example, method 300 may be performed by a pipeline testing component, such as the pipeline testing component 127 in FIG. 1. Alternatively, some or all of method 300 might be performed by another module or machine. It should be noted that blocks are depicted in FIG. 3 could be performed simultaneously or in a different order than that depicted.

At block 310, the processing logic identifies a pipeline of a plurality of pipelines of a continuous integration and continuous delivery/deployment (CI/CD) system. At block 320, the processing logic selects a repository of a plurality of repositories utilized by the identified pipeline. As described previously, each repository of the plurality of repositories may include at least one file.

At block 330, the processing logic modifies the repository. The processing logic modifies at least one file of the repository to modify the repository. As described previously, modifying at least one file includes adding to and/or deleting from the file's contents. As described previously, the processing logic may store a copy of the modified repository to one of a first storage location or a second storage location. The first storage location is a location on a storage device (e.g., local or remote) configured to store repositories. The second storage location refers to a storage location (e.g., workspace) from which the CI/CD system (e.g., build tool) operates the pipeline.

At block 340, the processing logic determines whether to test the modified repository. As described previously, the processing logic may prompt the users to "use the modified repository" (e.g., test the pipeline associated with the modified repository).

At block 350, responsive to determining to test the modified repository, the processing logic executes the identified pipeline with the modified repository. In one embodiment, to execute the identified pipeline with the modified repository, the processing logic clones the plurality of repositories excluding a repository associated with the modified repository to the second storage location and copies from the first storage location the copy of the modified repository to the second storage location. As described previously, the workspace includes the modified repository and the remaining repositories unmodified. Once the modified repository and the remaining repositories unmodified are in the workspace of the pipeline, the CI/CD system (e.g., build tool) may execute the pipeline.

In another embodiment, to execute the identified pipeline with the modified repository, the processing logic clones the plurality of repositories excluding a repository associated with the modified repository to the second storage location and accesses, during build (e.g., execution) of the identified pipeline, the first storage location to obtain the copy of the modified repository for execution. As described previously, the workspace includes the remaining repositories unmodified. Once the remaining repositories unmodified are in the workspace of the pipeline, the CI/CD system (e.g., build tool) may execute the pipeline and access the location of the modified repository during execution to complete the execution of the pipeline.

In yet another embodiment, to execute the identified pipeline with the modified repository, the processing logic clones the plurality of repositories excluding a repository associated with the modified repository to the second storage location containing the copy of the modified repository for execution. Once the remaining repositories unmodified are in the workspace of the pipeline containing the modified repository, the CI/CD system (e.g., build tool) may execute the pipeline.

Figure 4:
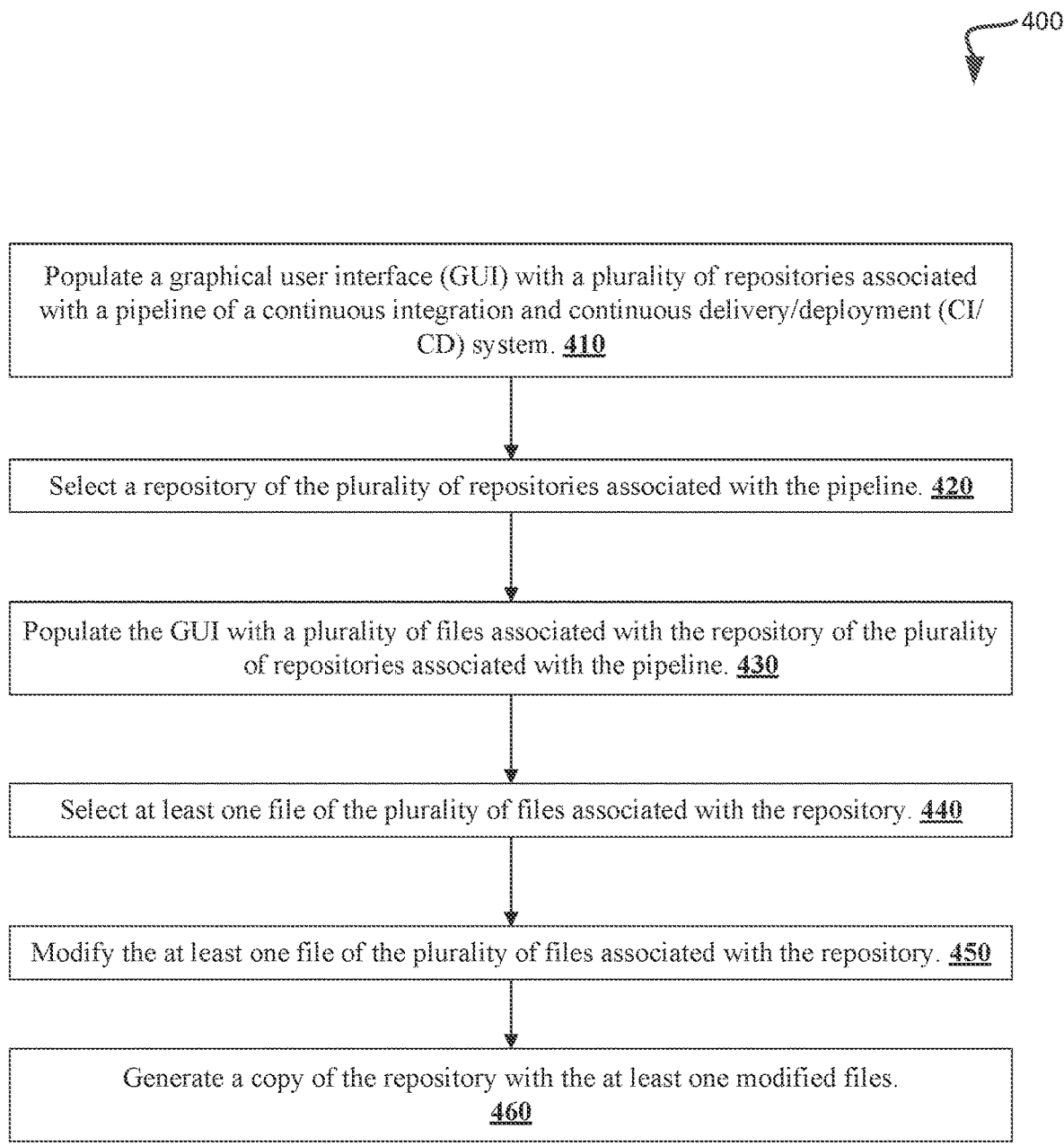
FIG. 4 depicts a flow diagram of a method for testing CI/CD pipelines using a modified repository, in accordance with one or more aspects of the present disclosure.

FIG. 4 depicts a flow diagram of an example method 200 for testing CI/CD pipelines using a modified repository in accordance with one or more aspects of the present disclosure. The method may be performed by processing logic that may comprise hardware (circuitry, dedicated logic, etc.), computer-readable instructions (run on a general-purpose computer system or a dedicated machine), or a combination of both. In an illustrative example, method 400 may be performed by a pipeline testing component, such as the pipeline testing component 127 in FIG. 1. Alternatively, some or all of method 400 might be performed by another module or machine. It should be noted that blocks depicted in FIG. 4 could be performed simultaneously or in a different order than that depicted.

At block 410, the processing logic populates a graphical user interface (GUI) with a plurality of repositories associated with a pipeline of a continuous integration and continuous delivery/deployment (CI/CD) system. At block 420, the processing logic selects a repository of the plurality of repositories associated with the pipeline. At block 430, the processing logic populates the GUI with a plurality of files associated with the repository of the plurality of repositories associated with the pipeline. As described previously, each repository of the plurality of repositories may include a respective at least one file. At block 440, the processing logic selects at least one file of the plurality of files associated with the repository.

At block 450, the processing logic modifies at least one file of the plurality of files associated with the repository. As described previously, modifying at least one file includes adding to and/or deleting from the file's contents.

At block 460, the processing logic generates a copy of the repository with at least one modified file. The processing logic stores the copy of the repository with at least one modified file to a first storage location to generate a copy of the repository with at least one modified file. The first storage location is a location on a storage device (e.g., local or remote) configured to store repositories.

In one embodiment, the processing logic clones, in a second storage location, the plurality of repositories excluding an unchanged repository of the plurality of repositories associated with the generated copy of the repository with the at least one modified files. Then, the processing logic stores, from the first storage location to the second storage location, the copy of the repository with the at least one modified files and executes the pipeline, from the second storage location, with the cloned plurality of repositories and the copy of the repository with the at least one modified files. The second storage location refers to a storage location (e.g., workspace) from which the CI/CD system (e.g., build tool) operates the pipeline. As described previously, the workspace includes the repository with at least one modified file and the unchanged repository of the plurality of repositories. Once the repository with at least one modified file and the unchanged repository of the plurality of repositories are in the workspace of the pipeline, the CI/CD system (e.g., build tool) may execute the pipeline.

In another embodiment, the processing logic clones, to a second storage location, the plurality of repositories excluding an unchanged repository of the plurality of repositories associated with the generated copy of the repository with the at least one modified files. Then, the processing logic accesses, from the first storage location, the copy of the repository with the at least one modified files and executes the pipeline, from the second storage location, with the cloned plurality of repositories and the copy of the repository with the at least one modified files. The second storage location refers to a storage location (e.g., workspace) from which the CI/CD system (e.g., build tool) operates the pipeline. As described previously, the workspace includes the unchanged repository of the plurality of repositories. Once the unchanged repository of the plurality of repositories is in the workspace of the pipeline, the CI/CD system (e.g., build tool) may execute the pipeline and access the repository with the at least one modified files from the first storage location during execution to complete execution of the pipeline.

Figure 5:
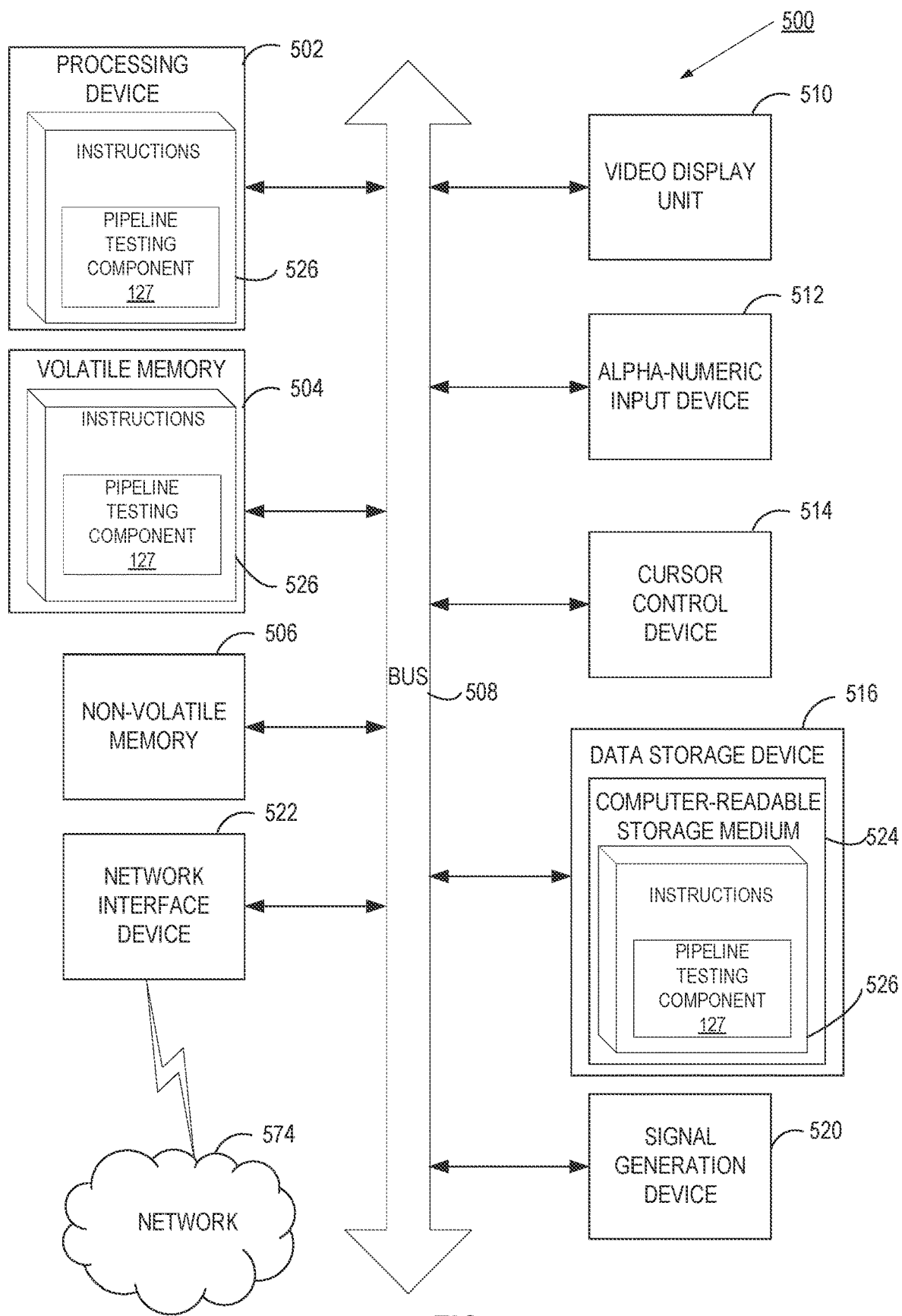
FIG. 5 depicts a block diagram of an exemplary computer system operating in accordance with one or more aspects of the present disclosure.

FIG. 5 depicts an example computer system 500, which can perform any one or more of the methods described herein. In one example, computer system 500 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application-specific integrated circuit (ASIC), a field-programmable gate array (FPGA), a digital signal processor (DSP), network processor, or the like. The processing device 502 is configured to execute processing logic (e.g., instructions 526) that includes the pipeline testing 127 for performing the operations and steps discussed herein (e.g., corresponding to the method of FIGS. 3 and 4, etc.).

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker). In one illustrative example, the video display unit 510, the alphanumeric input device 512, and the cursor control device 514 may be combined into a single component or device (e.g., an LCD touch screen).

The data storage device 516 may include a non-transitory computer-readable medium 524 on which may store instructions 526 that include pipeline testing component 127 (e.g., corresponding to the methods of FIGS. 3 and 4, etc.) embodying any one or more of the methodologies or functions described herein. Pipeline testing component 127 may also reside, completely or at least partially, within the main memory 504 and/or within the processing device 502 during execution thereof by the computer system 500, the main memory 504, and the processing device 502 also constituting computer-readable media. Pipeline testing component 127 may further be transmitted or received via the network interface device 522.

While the computer-readable storage medium 524 is shown in the illustrative examples to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding, or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media. Other computer system designs and configurations may also be suitable to implement the systems and methods described herein.

Although the operations of the methods herein are shown and described in a particular order, the order of the operations of each method may be altered so that certain operations may be performed in an inverse order or so that certain operations may be performed, at least in part, concurrently with other operations. In certain implementations, instructions or sub-operations of distinct operations may be in an intermittent and/or alternating manner.

It is to be understood that the above description is intended to be illustrative and not restrictive. Many other implementations will be apparent to those of skill in the art upon reading and understanding the above description. Therefore, the scope of the disclosure should be determined with reference to the appended claims, along with the full scope of equivalents to which such claims are entitled.

In the above description, numerous details are set forth. However, it will be apparent to one skilled in the art that aspects of the present disclosure may be practiced without these specific details. In some instances, well-known structures and devices are shown in block diagram form rather than in detail in order to avoid obscuring the present disclosure.

Unless specifically stated otherwise, as apparent from the following discussion, it is appreciated that throughout the description, discussions utilizing terms such as "receiving," "determining," "providing," "selecting," "provisioning," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for specific purposes, or it may comprise a general-purpose computer selectively activated or reconfigured by a computer program stored in the computer. Such a computer program may be stored in a computer-readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general-purpose systems may be used with programs in accordance with the teachings herein, or it may prove convenient to construct a more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, the use of the words "example" or "exemplary" is intended to present concepts in a concrete fashion. As used in this application, the term "or" is intended to mean an inclusive "or" rather than an exclusive "or." That is, unless specified otherwise or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, the use of the term "an embodiment" or "one embodiment" or "an implementation" or "one implementation" throughout is not intended to mean the same embodiment or implementation unless described as such. Furthermore, the terms "first," "second," "third," "fourth," etc., as used herein, are meant as labels to distinguish among different elements and may not have an ordinal meaning according to their numerical designation.

What is claimed is:

1. A method comprising:
   in response to user input via a graphical user interface (GUI) presented on a display device, identifying, by a computer system, a pipeline of a plurality of pipelines of a continuous integration and continuous delivery/deployment (CI/CD) system, the pipeline comprising a plurality of automated stages including at least a software compilation stage that translates source code into executable code and a deployment stage that installs the executable code onto a host machine for execution;
   identifying, by the computer system, a plurality of repositories utilized by the pipeline; presenting, by the computer system, the GUI on the display device that identifies the plurality of repositories;
in response to user input selecting an identified repository of the plurality of repositories, identifying, by the computer system, a plurality of files contained in the identified repository, the identified repository being stored in a first storage location; presenting, by the computer system, the GUI on the display device that identifies the plurality of files;
receiving, by the computer system, user input that modifies a file of the plurality of files to generate a modified file;
receiving, by the computer system, user input identifying a second storage location on which a copy of the identified repository, including the modified file instead of the file, is to be stored, the second storage location being a different location from the first storage location;
copying, by the computer system, the modified file and each other file of the identified repository to the second storage location to generate a modified repository; and
executing, by the computer system, the pipeline with the modified repository in place of the identified repository.

2. The method of claim 1, wherein each repository of the plurality of repositories includes a respective at least one file.

3. The method of claim 1, wherein executing the pipeline with the modified repository includes:
cloning, to the second storage location, the plurality of repositories excluding the identified repository.

4. The method of claim 1, wherein the second storage location refers to a storage location from which the CI/CD system operates the pipeline.

5. A system comprising:
a memory; and
a processor, operatively coupled to the memory, to perform operations comprising:
in response to user input via a graphical user interface (GUI) presented on a display device, identifying a pipeline of a plurality of pipelines of a continuous integration and continuous delivery/deployment (CI/CD) system, the pipeline comprising a plurality of automated stages including at least a software compilation stage that translates source code into executable code and a deployment stage that installs the executable code onto a host machine for execution;
identifying a plurality of repositories utilized by the pipeline; presenting the GUI on the display device that identifies the plurality of repositories; in response to user input selecting an identified repository of the plurality of repositories, identifying a plurality of files contained in the identified repository, the identified repository being stored in a first storage location;
presenting the GUI on the display device that identifies the plurality of files; receiving user input that modifies a file of the plurality of files to generate a modified file;
receiving user input identifying a second storage location on which a copy of the identified repository, including the modified file instead of the file, is to be stored, the second storage location being a different location from the first storage location;
copying the modified file and each other file of the identified repository to the second storage location to generate a modified repository; and
executing the pipeline with the modified repository in place of the identified repository.

6. The system of claim 5, wherein each repository of the plurality of repositories includes a respective at least one file.

7. The system of claim 5, wherein executing the pipeline with the modified repository includes cloning, to the second storage location, the plurality of repositories excluding the identified repository.

8. The system of claim 5, wherein the second storage location refers to a storage location from which the CI/CD system operates the pipeline.

9. A non-transitory computer-readable storage medium that includes executable instructions to cause a processor device to:
in response to user input via a graphical user interface (GUI) presented on a display device, identify a pipeline of a plurality of pipelines of a continuous integration and continuous delivery/deployment (CI/CD) system, the pipeline comprising a plurality of automated stages including at least a software compilation stage that translates source code into executable code and a deployment stage that installs the executable code onto a host machine for execution;
identify a plurality of repositories utilized by the pipeline; present the GUI on the display device that identifies the plurality of repositories;
in response to user input selecting an identified repository of the plurality of repositories, identify a plurality of files contained in the identified repository, the identified repository being stored in a first storage location;
present the GUI on the display device that identifies the plurality of files; receive user input that modifies a file of the plurality of files to generate a modified file;
receiving user input identifying a second storage location on which a copy of the identified repository, including the modified file instead of the file, is to be stored, the second storage location being a different location from the first storage location;
copying the modified file and each other file of the identified repository to the second storage location to generate a modified repository; and
execute the pipeline with the modified repository in place of the identified repository.

\* \* \* \* \*